United States Patent
Wang et al.

(10) Patent No.: US 6,995,902 B2
(45) Date of Patent: Feb. 7, 2006

(54) MICROSCOPIC IMAGING APPARATUS WITH FLAT-TOP DISTRIBUTION OF LIGHT

(75) Inventors: Hau-Wei Wang, Taipei (TW); Spring Ying-Cheun Yeh, Pingjen (TW); Chun-Hung Ko, Changhua (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 10/692,754

(22) Filed: Oct. 27, 2003

(65) Prior Publication Data

US 2004/0125441 A1 Jul. 1, 2004

(30) Foreign Application Priority Data

Dec. 30, 2002 (TW) ........................................ 91137893 A

(51) Int. Cl.
*G02B 21/06* (2006.01)

(52) U.S. Cl. ....................................... 359/385; 356/300
(58) Field of Classification Search .................. 359/15, 359/565, 566, 569, 368, 385, 389; 356/300, 356/301, 311, 328
See application file for complete search history.

(56) References Cited

U.S. PATENT DOCUMENTS

| | | | | |
|---|---|---|---|---|
| 5,943,129 A | * | 8/1999 | Hoyt et al. | 356/318 |
| 6,174,677 B1 | * | 1/2001 | Vo-Dinh | 435/6 |
| 6,201,229 B1 | * | 3/2001 | Tawa et al. | 250/201.5 |
| 6,392,805 B1 | | 5/2002 | Ohmori | 359/569 |
| 6,633,433 B2 | * | 10/2003 | Bergstein et al. | 359/569 |
| 6,816,316 B2 | * | 11/2004 | Caudle et al. | 359/637 |

FOREIGN PATENT DOCUMENTS

| | | |
|---|---|---|
| JP | P2001-228402 A | 8/2001 |
| TW | 351767 | 9/1997 |

* cited by examiner

*Primary Examiner*—Mark A. Robinson
*Assistant Examiner*—Alessandro Amari
(74) *Attorney, Agent, or Firm*—Bacon & Thomas, PLLC

(57) ABSTRACT

A microscopic imaging apparatus with flat-top distribution of light is disclosed, which includes an incident light source, a diffractive optical element, a beam-splitter, a tunable filter and an image sensor. The diffractive optical element receives an incident light provided by the incident light source and generates a uniform incident light. The uniform incident light illuminates a sample so that an optical signal is emitted from the sample. The optical signal passes through the beam-splitter and the filter unit to reach the image sensor for obtaining the detected image of the sample.

12 Claims, 5 Drawing Sheets

MICROSCOPIC IMAGING APPARATUS WITH FLAT-TOP DISTRIBUTION OF LIGHT

BACKGROUND OF THE INVENTION

1. Field of the Invention

The present invention relates to a global imaging apparatus and, more particularly, to a microscopic imaging apparatus having a optical beam with flat-top intensity distribution, which is suitable for applications of various fields, such as fluorescence or Raman system of global imaging.

2. Description of Related Art

The chemical compositions, impurities, and defects existing in target materials cannot be identified and inspected by traditional optical methods, and must be measured by chemical imaging techniques. By using the laser excited electronic state spectrum or the vibration state spectrum, the chemical bonding information of sample is obtained. Among three measured methods (i.e. the point scan, line scan and global imaging) in recent chemical imaging technologies, the global imaging method has the highest image acquisition speed under the same photo-energy density ($W/cm^2$). It is because the chemical image of larger illuminated area can be caught directly by array detector. The sample scanning or incident beam scanning is not needed for the global imaging. Thus, the global image has a superior measured speed property.

However, in most cases, the incident light is a Gaussian beam, whose cross section has a stronger intensity distribution at the center of a light beam than that at the edge, as shown in FIG. 1. As a result, the chemical image excited by Gaussian beam produces severe non-uniformality, which often causes a misreading of the concentration of sample. As shown in FIG. 2, the spectrum of sample A or C at the edge is different from the spectrum of sample B in the center. This property limits the development of the global imaging method. Thus, it is necessary to find a new method for solving the non-uniformity problem.

For prior chemical image measurement systems, there are three methods to overcome the problems caused by non-uniform beams. First, by using a Powell lens, the central part of the laser beam can diverge faster than the edge part does. A laser beam with an approximate flat-top intensity distribution is obtained according to the Snell's law, i.e. laws of optical refraction at surface. However, the manufacture of a Powell lens is difficult, and only a two-dimensional Powell lens can be obtained. The laser beam can only be modified into a uniform line source. This method can only be applied in the scope of line scan chemical image, and cannot be put into application at the global imaging.

Another improvement can be achieved by using a natural density filter with a specialized distribution for optical attenuation. The light attenuation of filter at the center is stronger than that at the edge, the intensity of laser beam is transformed into approximate flat-top distribution. The method is applied to the chemical imaging spectrum system of the global imaging. But the components having a low damage threshold and high absorption from light heating can only be applied to the fluorescent chemical imaging system which has low laser illumination power. It cannot be used in the Raman chemical imaging system having high laser illumination power.

The third way for improving the intensity distribution of the beam is to project a Gaussian beam into a holographic optical element, on which there is an interference spectrum record of the Gaussian beam and the flat-top beam for obtaining a recovered flat-top beam. However, both the energy conversion efficiency and the damage threshold of the components are low. It also cannot be effectively used to all of the global image systems.

Therefore, it is desirable to provide a microscopic imaging apparatus to mitigate and/or obviate the aforementioned problems.

SUMMARY OF THE INVENTION

The object of the present invention is to provide a microscopic imaging apparatus with flat-top light distribution so as to overcome the problem of a non-uniform global image caused by the Gaussian beam, to make the global image much more practical, and to set up an innovative chemical image microscopic apparatus that has a fast measured speed and forms a realistic image.

Another object of the present invention is to provide a microscopic imaging apparatus with flat-top intensity distribution, which is easily set up, small in size, durable under high power, and having high energy conversion efficiency.

To achieve the objects, the microscopic imaging apparatus with flat-top intensity distribution of the present invention includes an incident light source for providing an incident light; a diffractive optical element for receiving said incident light and generating a uniform incident light; a beam-splitter for reflecting said uniform incident light onto at least one target sample and further exciting said target sample to emit a light with optical signals passing through said beam-splitter; and an image sensor for receiving said light with optical signals passing through said beam-splitter to obtain at least one detected image of said sample.

The microscopic imaging apparatus of the present invention further includes a tunable filter disposed between said light splitting unit and said image sensor for filtering an image with a specific wavelength. The tunable filter is a liquid crystal tunable filter (LCTF) or an acoustic-optic tunable filter (AOTF). The apparatus further comprises a beam expander disposed between said diffractive optical element and said beam-splitter for expanding and collimating said uniform incident light. Between said beam-splitter and said sample, there is further an objective lens for transmitting said detected image and varying the magnification ratio. The material of the diffractive optical element is passable for visible light or infrared rays, such as quartz, polymethyl methacrylate (PMMA), or silicon. There is further a high pass filter disposed between said beam-splitter and said tunable filter for preventing said image sensor from receiving said incident light. An imaging lens mounted between said tunable filter and said image sensor is optionally included for facilitating said image sensor to capture said detected image. The image sensor could be a charge coupled device (CCD) detector or other array detector, such as an image-enhanced charge coupled device (ICCD), a photodiode array (PDA), or a vidicon. The diffractive optical element is designed according to the Scalar Diffraction Theory.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
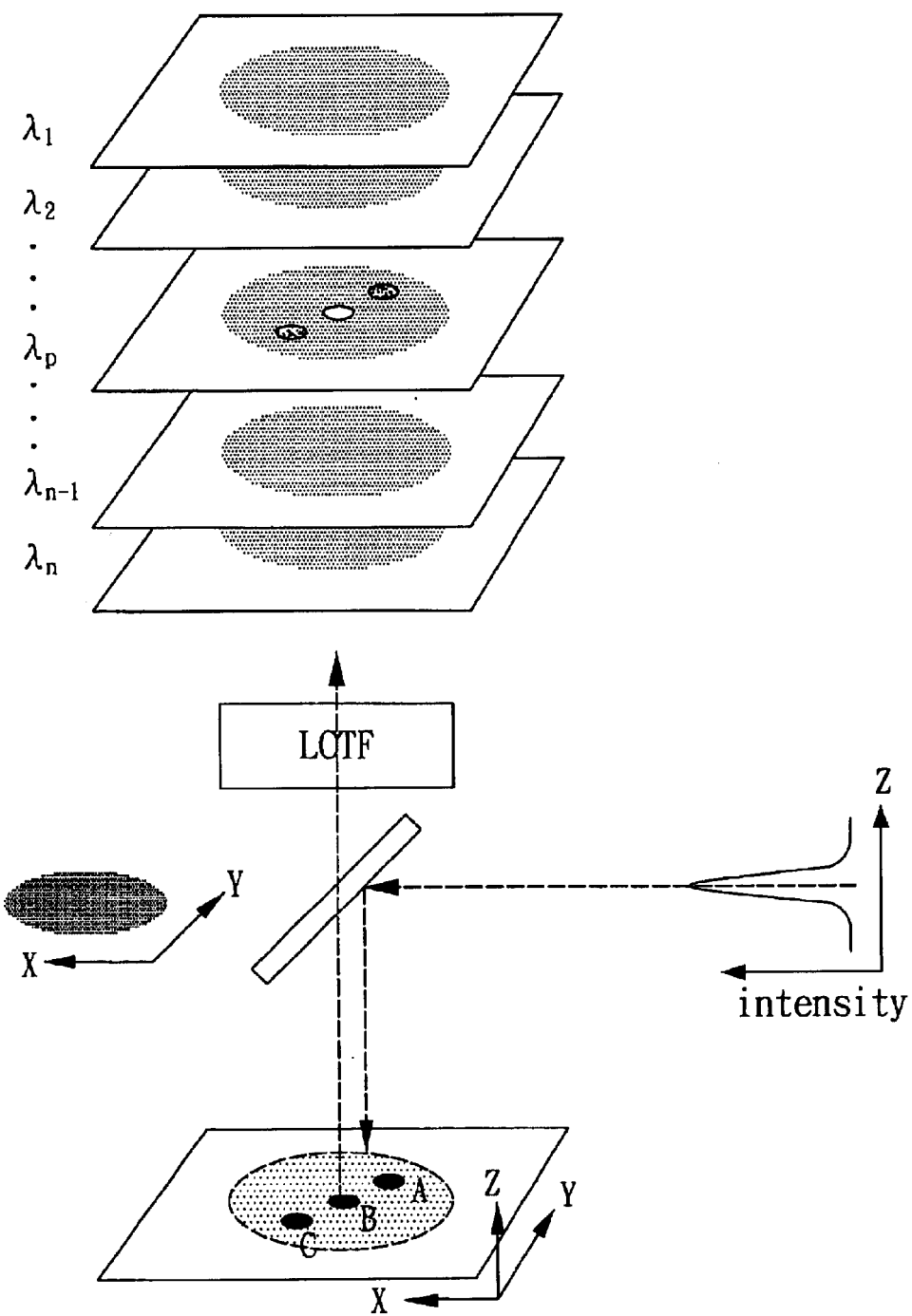
FIG. 1 a perspective view of the global image microscopic apparatus of a prior art.
Figure 2:
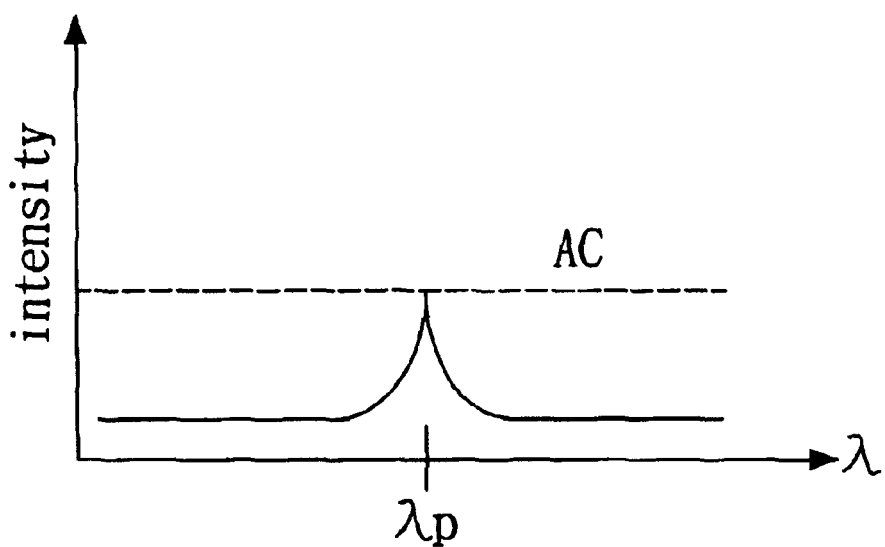
FIG. 2 shows the spectra obtained in the prior art.
Figure 2:
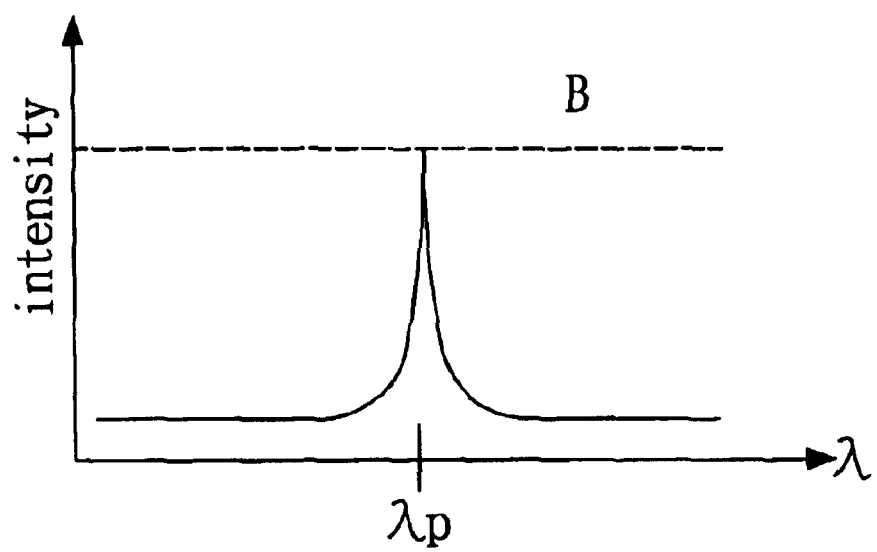
Figure 3:
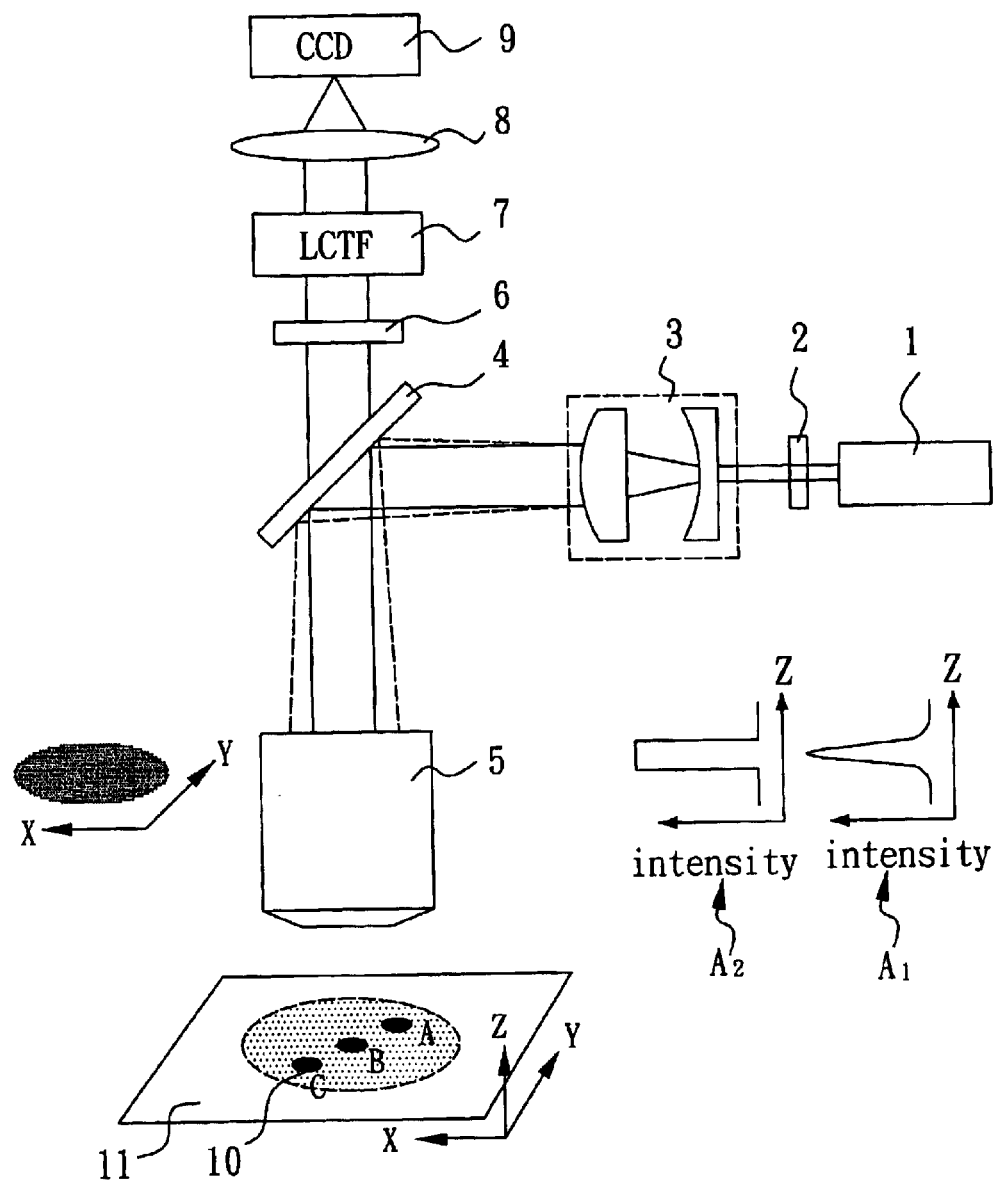
FIG. 3 is a perspective view of the microscopic imaging apparatus of the present invention.

The preferred example illustrates the microscopic imaging apparatus of the present invention with the detection of polystyrene micro-spheres. With reference to FIG. 3, there is shown a microscopic imaging apparatus composed of an incident light source 1, a diffractive optical element 2, a beam expander 3, a beam-splitter 4, an objective lens 5, an optical filter 6, a tunable filter 7, an imaging lens 8, an image sensor 9, a sample 10, and a holder 11.

The incident light source 1 of the present example can be any kind of light source. Preferably, it is a light emitting diode or a laser diode, and most preferably, it is a laser. The diffractive optical element 2 is made of visible light or infrared rays passable materials. Preferably, the diffractive optical element 2 is made of quartz, polymethyl methacrylate (PMMA), or silicon according to the Scalar Diffraction Theory. The sample 10 is polystyrene micro-spheres. Preferably, the beam-splitter 4 is a dichroic mirror, the optical filter 6 is a high pass filter, and the tunable filter 7 is an acoustic-optic tunable filter (AOTF). Most preferably, the tunable filter 7 is a liquid crystal tunable filter (LCTF). The image sensor 9 is preferably a charge coupled device (CCD) or another array detector, such as an image-enhanced charge coupled device (ICCD), a photodiode array (PDA), or a vidicon.

Figure 4:
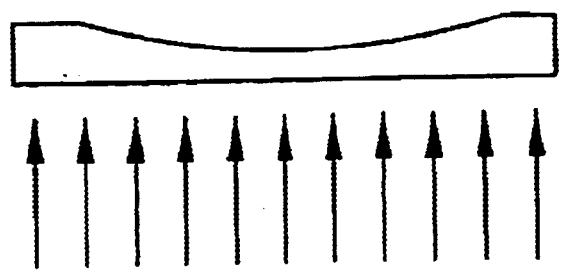
FIG. 4 is a perspective view showing the cross-section of the diffractive optical element of the present invention.

The intensity distribution of the laser beam emitting from the incident light source 1 is shown as A1. FIG. 4 is a cross-section of the diffractive optical element 2. As shown in FIG. 4, because the diffractive optical element has a smooth surface and a thinner thickness at the center than at the edge, the laser beam impinging on the diffractive optical element 2 at different points has a different light path, which leads to a redistribution of beam energy due to the destructive and constructive interference after passing through the diffractive optical element. As a result, the laser beam is transformed into a uniform incident light, which has a flat-top wave pattern, as shown in A2. Also, the diffractive optical element 2 need not have either a smooth surface or a thinner thickness at center than at the edge. The diffractive optical element may be designed in other styles, for example, a ladder shape or a grating shape.

Figure 5:
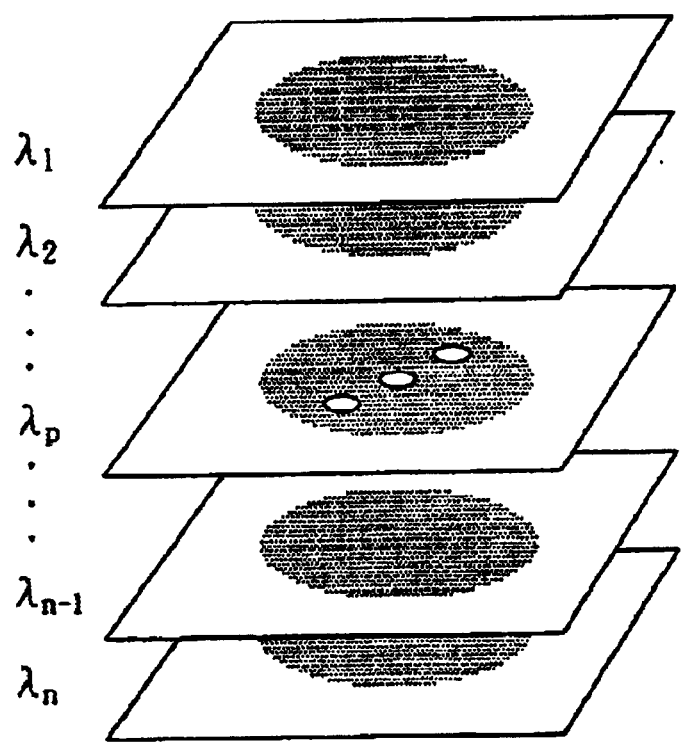
FIG. 5 shows the chemical images obtained according to the present invention.
Figure 6:
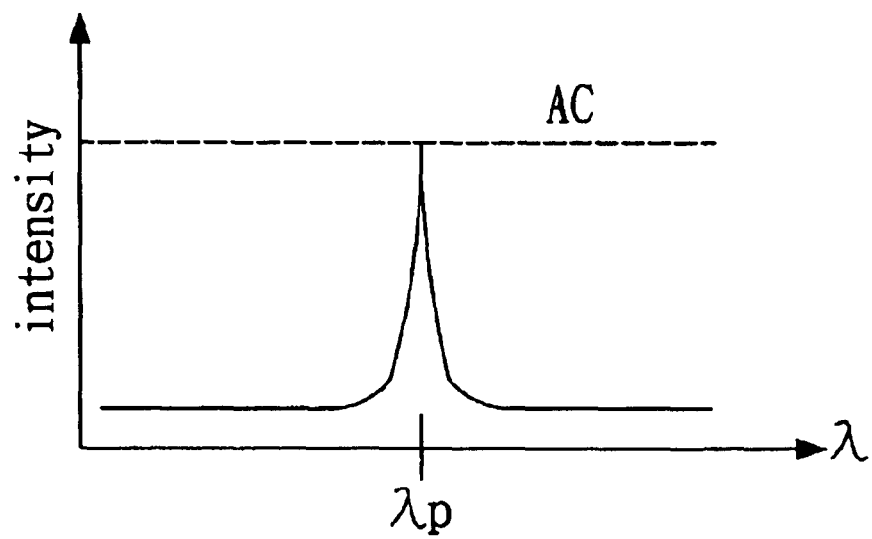
FIG. 6 shows the spectra obtained by the microscopic imaging apparatus of the present invention.
Figure 6:
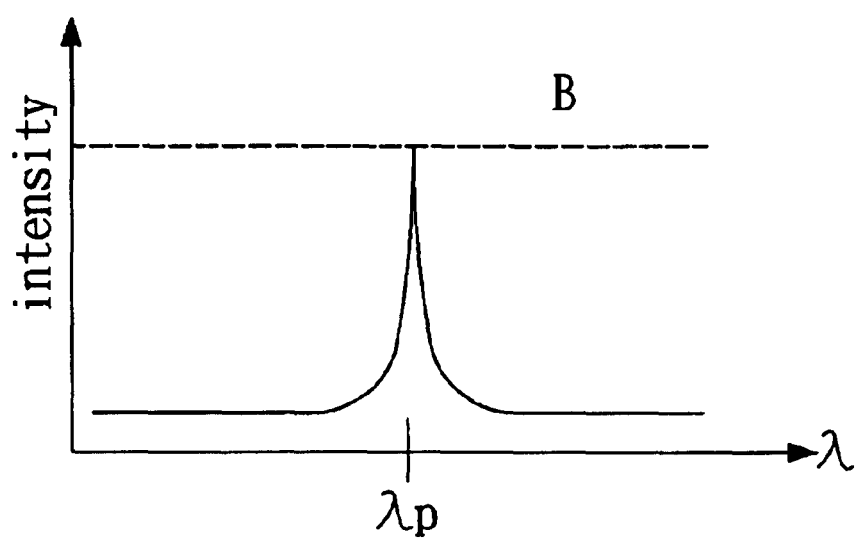

The uniform incident light then directs to the beam expander 3 to become a slightly expanded light beam, which is subsequently reflected by the beam-splitter 4 to the objective lens 5, and then directs on the sample 10 on the holder 11. The sample contains polystyrene micro-spheres having three concentrations of A, B, and C. After being irradiated by the slightly expanded uniform incident light, the sample 10 is excited to emit a chemical image. The lights scattering in opposite directions are collected by the objective lens 5, and then guided to the beam-splitter 4 and the optical filter 6. The optical filter 6 is used to prevent the image sensor 9 from receiving the incident light that has passed through the imaging lens 8. The incident light may damage image sensor 9 or produce noise. The chemical image passing through the optical filter 6 is further incident on the tunable filter 7. In this preferred example, the tunable filter 7 is a liquid crystal tunable filter, of which the crystal orientation could be varied by the bias voltage such that the wavelength at the center of the bandpass is adjusted rapidly. For example, the central wavelength may firstly be set at 510 nm, 520 nm, 530 nm, . . . , or 600 nm to filter each chemical image signal with a specific wavelength. After the chemical image passes through the tunable filter 7, a uniform chemical image will be formed in the image sensor 9 with the aid of the imaging lens 8, as shown in FIG. 5. In the field of view, the central item B of sample 10 has a spectrum identical with that of the peripheral items of A and C of sample 10, as shown in FIG. 6, which means that there is an identical spectrum behavior at any point of the sample 10.

From the aforementioned description, it is known that the present invention uses a diffractive optical element to transform the Gaussian beam into a uniform incident light with a flat-top distribution of light intensity. Afterwards, the uniform incident light passes through the beam-splitter and the objective lens, and irradiates the sample on the holder. After being irradiated by the light beam, the sample is excited to emit a chemical image, which is then collected by the objective lens, passes through the beam-splitter and the tunable filter, and finally forms an image in the image sensor with the aid of the imaging lens. The present invention not only overcomes the problem of non-uniform global image caused by the Gaussian laser beam to vastly increase the practicability of the global image, but also sets up an innovative chemical image microscopic apparatus that has a fast measured speed and forms a realistic image.

Although the present invention has been explained in relation to its preferred embodiment, it is to be understood that many other possible modifications and variations can be made without departing from the spirit and scope of the invention as hereinafter claimed.

What is claimed is:

1. A microscopic imaging apparatus with flat-top distribution of light comprising:

an incident light source for providing an incident light;

a diffractive optical element for receiving said incident light and generating a uniform incident light;

a beam-splitter for reflecting said uniform incident light onto at least one target sample and further exciting said target sample to emit a light with optical signals passing through said beam-splitter; and an image sensor for receiving said light with optical signals passing through said beam-splitter to obtain at least one detected image of said sample, wherein said diffractive optical element has a smooth and continuous surface, and the thickness at the center of the diffractive optical element is less than that of the edges.

2. The microscopic imaging apparatus as claimed in claim 1, wherein the intensity of said incident light is a Gaussian distribution, and the incident light is transformed to a light having an intensity of flat-top distribution by passing through said diffractive optical element.

3. The microscopic imaging apparatus as claimed in claim 1 further comprising a tunable filter disposed between said beam splitter and said image sensor for filtering an image with a specific wavelength.

4. The microscopic imaging apparatus as claimed in claim 3, wherein said tunable filter is a liquid crystal tunable filter (LCTF) or an acoustic-optic tunable filter (AOTF).

5. The microscopic imaging apparatus as claimed in claim 3, further comprising a optical filter disposed between said beam-splitter and said tunable filter for preventing said image sensor from receiving said incident light.

6. The microscopic imaging apparatus as claimed in claim 5, wherein said optical filter is a high pass filter.

7. The microscopic imaging apparatus as claimed in claim 3, further comprising an imaging lens mounted between said tunable filter and said image sensor to facilitate the capture and formation of said detected image on said image sensor.

8. The microscopic imaging apparatus as claimed in claim 1, further comprising a beam expander disposed between said diffractive optical element and said beam-splitter for expanding said uniform incident light.

9. The microscopic imaging apparatus as claimed in claim 1, further comprising an objective lens located between said beam-splitter and said sample for transmitting said detected image and adjusting the magnification ratio of said image.

10. The microscopic imaging apparatus as claimed in claim 1, wherein said diffractive optical element only allows the light with a wavelength in a range of visible light or infrared rays to pass through said diffractive optical element.

11. The microscopic imaging apparatus as claimed in claim 10, wherein said diffractive optical element is made of quartz, polymethyl methacrylate (PMMA), or silicon.

12. The microscopic imaging apparatus as claimed in claim 1, wherein said image sensor is a charge coupled device (CCD), an image-enhanced charge coupled device (ICCD), a photodiode array (PDA), or a vidicon.

* * * * *